Patented Jan. 21, 1941

2,229,361

UNITED STATES PATENT OFFICE 2,229,361

METHOD OF CATALYSIS

Johann A. Bertsch, St. Louis, Mo., assignor to Monsanto Chemical Co., St. Louis, Mo., a corporation of Delaware No Drawing. Application July 31, 1939,
Serial No. 287,558

17 Claims. (Cl. 260—342)

The present invention relates to a new method for carrying out catalytic reactions and it has particular relation to the catalytic oxidation of organic materials. This application is a continuation-in-part of my copending application, Serial No. 31,893, filed July 17, 1935.

The main object of the invention is to provide a method for catalytically oxidizing organic materials which substantially obviates the formation of undesirable by-products.

It has long been known that certain substances, termed catalysts, have the property of promoting chemical reactions between various substances without themselves being appreciably altered or decomposed as a result of the reaction. Therefore, they may be used repeatedly and a small amount of catalyst is sufficient to promote reaction between large amounts of primary materials. This promotive action of the catalysts seems to be a surface phenomenon and therefore it is desirable to employ the catalyst in highly attenuated form with as much surface as practicable exposed to the reacting ingredients. Also some catalytic substances, while they are chemically inert, under the conditions of reaction tend to disintegrate into relatively fine fragments or dust which, if the reaction involves the use of the primary ingredients in gaseous phase may be blown away and lost, or which tend to clog the catalytic bed and thus to hinder the flow of gas therethrough. For both of these reasons it has long been considered desirable to support the catalytic materal upon some mechanically strong and chemically inert body which has the combined effect of greatly extending the exposed surface of the catalyst and of acting as a support to prevent mechanical disintegration of the catalyst into a dust.

The requirements placed upon such carrier are relatively stringent:

First: It should be inert or helpful with respect to the reaction in which it is to be employed or at least it should not slow the action of the catalyst or promote undesired side reactions.

Second: It should be mechanically strong and not itself subject to disintegration into a powder or dust during the course of use.

Third: It should be easily formed into bodies of regular configuration which will permit practically uniform flow into all portions of the catalytic bed formed therefrom.

Fourth: It must be susceptible of intimate association with the catalytic material which is to be supported and during the course of use it must not tend materially to split or separate from the catalyst.

Fifth: It must be of such refractory nature that it will not tend to sinter and fuse down into non-porous form during use in high temperature reactions.

Among the substances which have ben suggested as catalyst carriers are the following: ordinary unglazed porcelain, pumice and asbestos. For many purposes, porcelain, pumice and asbestos are highly unsuitable because they contain basic constituents which are found to be especially active combustion catalysts. Fibrous materials such as asbestos lose their mechanical strength and disintegrate to dust under the prolonged influence of high temperatures. Pumice, for example, when used as a support for catalysts in such reactions as the air oxidation of naphthalene to form phthalic anhydride causes the complete combustion into carbon dioxide of an excessive amount of the primary material.

With respect to catalytic inactivity toward chemical reactions and resistance to fusion by heat, silica in porous form is recognized as being of exceptional merit as a catalyst carrier. However, heretofore, it has been difficult to obtain bodies thereof of regular configuration and of suitable resistance to moisture and mechanical disintegration to admit of its convenient application for some purposes. Most of the binders used heretofore to make regularly shaped catalyst carriers were of acid or alkaline nature and had the disadvantage of either weakening the catalytic action or causing unfavorable side reactions.

The present invention comprises the discovery that finely ground silica or material rich in silica may be admixed with a finely ground refractory glass of the "Pyrex" type, that is, one which is low in basic constituents such as sodium, potassium and calcium, and then heated to a temperature sufficient to soften the glass to obtain bodies suitable for catalyst carriers. These carriers are mechanically very hard and strong, chemically inert when used in the catalytic oxidation of organic materials, and of sufficient porosity to absorb or otherwise hold and retain a catalytic material in relatively permanent association.

The invention further involves a highly convenient method of preparing such carriers by adding to the pulverized silica and glass a temporary and volatile binder which holds the material as a coherent mass during the preliminary stages of forming but disappears during calcination.

The preparation of a catalyst carrier composition in accordance with the provisions of the present invention is susceptible of numerous modifications. However, the following constitutes a specific example of one method which has been found to be highly satisfactory. Silica or a highly silicious material is ground or otherwise reduced to a relatively fine state, for example, to such state as to admit of its passage through a screen of 100–200 mesh and is then admixed with a suitable percentage (e. g. 15%) of ground and relatively refractory glass. A glass of high silica content is preferred. The glass should be relatively low in basic constituents since these tend to promote undesirable side reactions. The glass sold under the commercial name of "Pyrex", which consists mainly of silica, an amount of boron together with relatively small proportions of basic materials is found to be quite satisfactory. Common window glass, for example, would on the other hand be entirely unsuitable since it contains large proportions of basic constituents. These basic materials function as combustion catalysts and a catalytic mass containing appreciable proportions of them will show an unsatisfactory conversion of the organic material to the desired product and large amounts of carbon dioxide and water will be produced. The fineness of grinding of the glass may vary to a considerable extent but 100 mesh material is found to give good results.

After mixing for purposes of forming this composition into pellets suitable for calcination, it is desirable to add to the mixture of silica and ground glass a temporary binder, for example, an organic substance which, while it acts as a binder for the uncalcined material, is susceptible of volatilization without leaving an appreciable amount of residue in the final product. An excellent binder may be prepared by admixing stearic acid with cyclohexanol, the amount of the first being 1-2% by weight of the silica-pyrex mixture and that of the second being 15%. This binder when admixed with the silica-glass mixture forms a dough which can be easily molded into pellets or other convenient shapes.

An especially effective catalyst support is obtained by shaping the dough into small cylinders whose axes and diameters are of equal dimensions. Supports of this form are not subject to packing and give less resistance to the flow of gas than any other form available. After the pellets have been formed they may be dried with air (preferably a stream of air) at a temperature of 100° C. When they are sufficiently dried to admit of handling, they are placed in an ordinary muffle furnace and burned at bright red heat for three to four hours. In this burning operation substantially all of the organic binder is evaporated or completely burned and there remain hard, refractory, porous, white, water insoluble, chemically inert pellets of very regular configuration.

The catalytic material may be applied to these pellets in any convenient manner. One method involves forming a solution of the soluble salts of catalysts for example a saturated solution of ammonium vanadate and then applying the solution by spraying or dipping. The solution is absorbed into the pellet to give a highly intimate and permanent association between catalyst and carrier. A second method, which may be conveniently employed, involves merely dusting the pellets with finely ground catalytic material. A third method involves fusing the catalyst and then dipping the carrier pellets thereinto. In this last method it is found that the pellets act as sponges to take up the molten catalytic substances to give intimate and permanent association. If the catalyst is applied as a powder it may be caused to enter into the pores of the carrier and thus to be intimately bonded thereto, by subjecting the pellets to a second step of calcination at a temperature sufficient to fuse the catalyst to the carrier. The intimacy of the bond between carrier and catalyst as obtained by spraying or dipping the carrier with solutions of the catalytic substances also may be intensified by heating the coated pellets to the fusion point of the deposited catalytic compound.

Any material which catalyzes the oxidation of organic materials may be applied to the carrier pellets in this manner. Among the substances which may be mentioned are platinum, vanadium, iron sesquioxide mixed with vanadium and molybdenum or salts and oxides thereof. Vanadium pentoxide is a particularly effective catalyst for the oxidation of naphthalene to form phthalic anhydride and maleic anhydride. It is best applied to the carrier pellets by fusing it and then dipping the pellets into the molten mass. The pellets then act as sponges to take up the fused pentoxide into intimate association.

Components of glass may also be admixed with large amounts of silica, and this mixture upon heating will give a partially fused mass useful as a catalyst carrier.

In forming a catalyst for especially delicate air oxidation reactions it may be desirable to leach the carrier pellet with a dilute acid solution, for example hydrochloric acid, before impregnation with the catalytic material. For most purposes however, this is not necessary and good results will be obtained, for example in the air oxidation of naphthalene to phthalic anhydride, when the pellets are used without leaching.

The following specific examples illustrate the method of oxidizing organic materials by the method of the present invention.

Carrier pellets are prepared as described above and coated with vanadium oxide. Over this catalyst is passed a mixture of air and naphthalene vapor in an approximate ratio of one pound of naphthalene to 25 pounds of air at a temperature of 440° C. A yield of about 85% phthalic anhydride by weight is obtained together with a small proportion of maleic anhydride but substantially no undesired by-products are formed.

Carrier pellets prepared as above are coated with a mixture of 70% vanadium oxide and 30% molybdenum oxide. A mixture of benzene vapor and air in a ratio of about one pound of benzene to 25 pounds of air is passed over this catalyst at a temperature of 460° C. The yield of this reaction expressed as maleic acid is 70% by weight with substantially no formation of undesired by-products.

Similarly diphenyl may be oxidized to maleic acid, toluene to benzaldehyde and benzoic acid, ethylene to formaldehyde and anthracene to anthraquinone by the use of the present invention all without the formation of substantial proportions of undesirable by-products.

The carrier pellets, prepared in accordance with the provisions of this invention, are mechanically strong and resistant to chemical and thermal disintegration and also to the action of water or moisture. They are also practically catalytically inert when use for the oxidation of organic materials and do not appreciably promote side reactions. When used with such catalytic substances as vanadium pentoxide in the oxidation of naphthalene to form phthalic anhydride and maleic anhydride they are very similar in catalytic characteristics to pure vanadium oxide and give practically as good conversion into the desired product as the straight oxides. However, their use admits of considerable saving of relatively valuable vanadium compound, and, furthermore, the catalytic bodies are of highly uniform character and as a result uniform distribution of gases in the catalytic bed is obtained and the resistance to flow of gases is also very low. Of course, this is a great improvement over pure vanadium oxide because it is very difficult or impracticable to form the latter into uniform pellets. Vanadium oxide likewise is subject to mechanical or thermal disintegration during use, which difficulty is practically obviated by employing the improved carrier pellets constituting the subject matter of the present invention.

Resistance to fusion is a highly important characteristic of catalysts prepared as above described. For example, the carriers are quite resistant to temperatures up to 900° C. or even above and are thus superior to zeolitic catalysts employed for many chemical reactions because at such temperatures the zeolites would be sintered down into relatively non-active state. Of course, catalytic pellets formed of such fusible material would become practically impermeable to air or other gases, or, if they were not impermeable, channels would be formed in the fused mass, through which the gases would flow without any appreciable chemical reaction.

Although I have shown and described only the preferred embodiments of the invention, it is manifest that numerous modifications may be made therein without departure from the spirit of the invention or the scope of the following claims.

What is claimed is:

1. In the process of catalytically oxidizing organic material comprising contacting a mixture of the organic material and oxygen with a catalyst, the improvement comprising passing the reactants into contact with a catalyst comprising a porous, inert carrier body composed of finely divided silica, the particles of which are bonded together by finely divided particles of a refractory glass which is low in basic constituents, said carrier being impregnated with a catalytically active material containing vanadium, said catalyst being further characterized in that it has substantially no tendency to catalyze side reactions.

2. In the process of catalytically oxidizing naphthalene to phthalic anhydride comprising contacting a mixture of naphthalene and oxygen with a catalyst, the improvement comprising passing the reactants into contact with a catalyst comprising a porous, inert carrier body composed of finely divided silica, the particles of which are bonded together by finely divided particles of a refractory glass which is low in basic constituents, said carrier being impregnated with a catalytically active material for the oxidation, said catalyst being further characterized in that it has substantially no tendency to catalyze side reactions.

3. In the process of catalytically oxidizing organic materials comprising contacting a mixture of the organic material and oxygen with a catalyst, the improvement comprising passing the reactants into contact with a catalyst comprising a porous, inert carrier body composed of finely divided silica, the particles of which are bonded together by finely divided particles of a refractory glass which is low in basic constituents, said carrier having been leached with an acidic solution and then impregnated with a catalytically active material for the oxidation, said catalyst being further characterized in that it has substantially no tendency to catalyze side reactions.

4. A catalyst carrier for the support of catalysts for the air oxidation of organic materials comprising a porous, inert mass of finely subdivided silica, the particles of which are bonded together by a matrix of a refractory glass which is high in silica and low in basic constituents.

5. A catalyst carrier for the support of catalysts for the air oxidation of organic materials comprising a porous, inert mass of finely subdivided silica, the particles of which are bonded together by a matrix of a refractory glass which is high in silica and low in basic constituents, and further characterized by the fact that it has substantially no tendency to catalyze side reactions.

6. A catalyst for vapor phase partial oxidation of organic compounds comprising a highly porous body composed of finely subdivided silica, the particles of which are bonded together by a matrix of a refractory glass which is high in silica and low in basic constituents, the body being impregnated with a catalytic substance for the oxidation, said catalyst being further characterized in that it has substantially no tendency to catalyze side reactions.

7. A catalytic body as defined in claim 6 in which the catalytic substances are fused into the pores of the catalyst carrier.

8. A catalyst for the vapor phase partial oxidation of organic compounds consisting of a porous, inert carrier body composed of finely divided silica, the particles of which are bonded together by finely divided particles of a refractory glass which is high in silica and low in basic constituents, said carrier being impregnated with a catalytically active material for the oxidation containing vanadium, said catalyst being further characterized in that it has substantially no tendency to catalyze side reactions.

9. A catalyst as defined in claim 8 in which the catalyst material is fused vanadium pentoxide.

10. The method of forming a porous, refractory, chemically inert carrier for catalysts used in the air oxidation of organic materials which comprises mixing ground silica with a ground refractory glass which is high in silica and low in basic constituents, and then subjecting the mixture to a temperature sufficient to soften the glass so as to form a bond between the particles of silica.

11. A method of forming porous, refractory, chemically inert carrier for catalysts suitable for the air oxidation of organic materials, which comprises mixing silica with a ground refractory glass which is high in silica and low in basic constituents, shaping the resulting mass into the form of pellets, and calcining the mass sufficiently to soften the glass and form a bond between the particles of silica.

12. The method of forming porous, refractory, chemically inert carriers for catalysts suitable for the air oxidation of organic materials, which comprises mixing finely divided silica with finely divided refractory glass which is high in silica and low in basic constituents and with a volatile binder, shaping the resulting mass into the form of pellets and calcining the mass to volatilize the volatile binder and to form the glass into a bond about the particles of silica.

13. The method of preparing porous catalytic bodies for the air oxidation of organic materials which comprises mixing finely divided silica and a ground refractory glass which is high in silica and low in basic constituents, heating the resulting mixture sufficiently to soften the glass to form a bond between the particles of silica and then impregnating the mass with a fused, catalytically active material, said catalytic body being further characterized in that it has substantially no tendency to catalyze side reactions.

14. The method of forming a porous, catalytically active body for the vapor phase, partial oxidation of organic compounds which comprises mixing finely divided silica with ground refractory glass which is high in silica and low in basic constituents, forming a dough of the mixture by adding a volatile binder thereto, forming the mass into bodies of desired shape, calcining the bodies to evaporate the volatile binder and to soften the glass so as to form a bond between the particles of silica and subsequently dipping the bodies into a fused catalytically active material, said catalytic body being further characterized in that it has substantially no tendency to catalyze side reactions.

15. A catalyst carrier for the support of catalysts for the air oxidation of organic materials consisting of about 85% of ground silica and about 15% of a refractory glass which is high in silica and low in basic constituents and constitutes a bond between the particles of silica, said carrier being porous and having substantially no tendency to catalyze side reactions.

16. A catalyst for the air oxidation of organic materials consisting of a porous, inert carrier body composed of finely divided silica, the particles of which are bonded together by a matrix of refractory glass which is high in silica and low in basic constituents, said carrier containing approximately 97% of silica and less than 1% of basic constituents and being impregnated with a catalyst for the oxidation containing vanadium, said carrier and said catalyst having substantially no tendency to catalyze side reactions.

17. In the process of catalytically oxidizing organic materials comprising contacting a mixture of the organic material and oxygen with a catalyst, the improvement comprising passing the reactants into contact with a catalyst comprising a porous, inert carrier body composed of finely divided silica, the particles of which are bonded together by finely divided particles of a refractory glass which is low in basic constituents, said carrier being impregnated with a catalytically active material for the oxidation, said catalyst being further characterized in that it has substantially no tendency to catalyze side reactions.

JOHANN A. BERTSCH.